March 6, 1962
M. D. TUPPER
3,024,377
CORE AND COIL IMPROVEMENT FOR SMALL MOTORS AND THE LIKE
Filed March 30, 1959
2 Sheets-Sheet 1
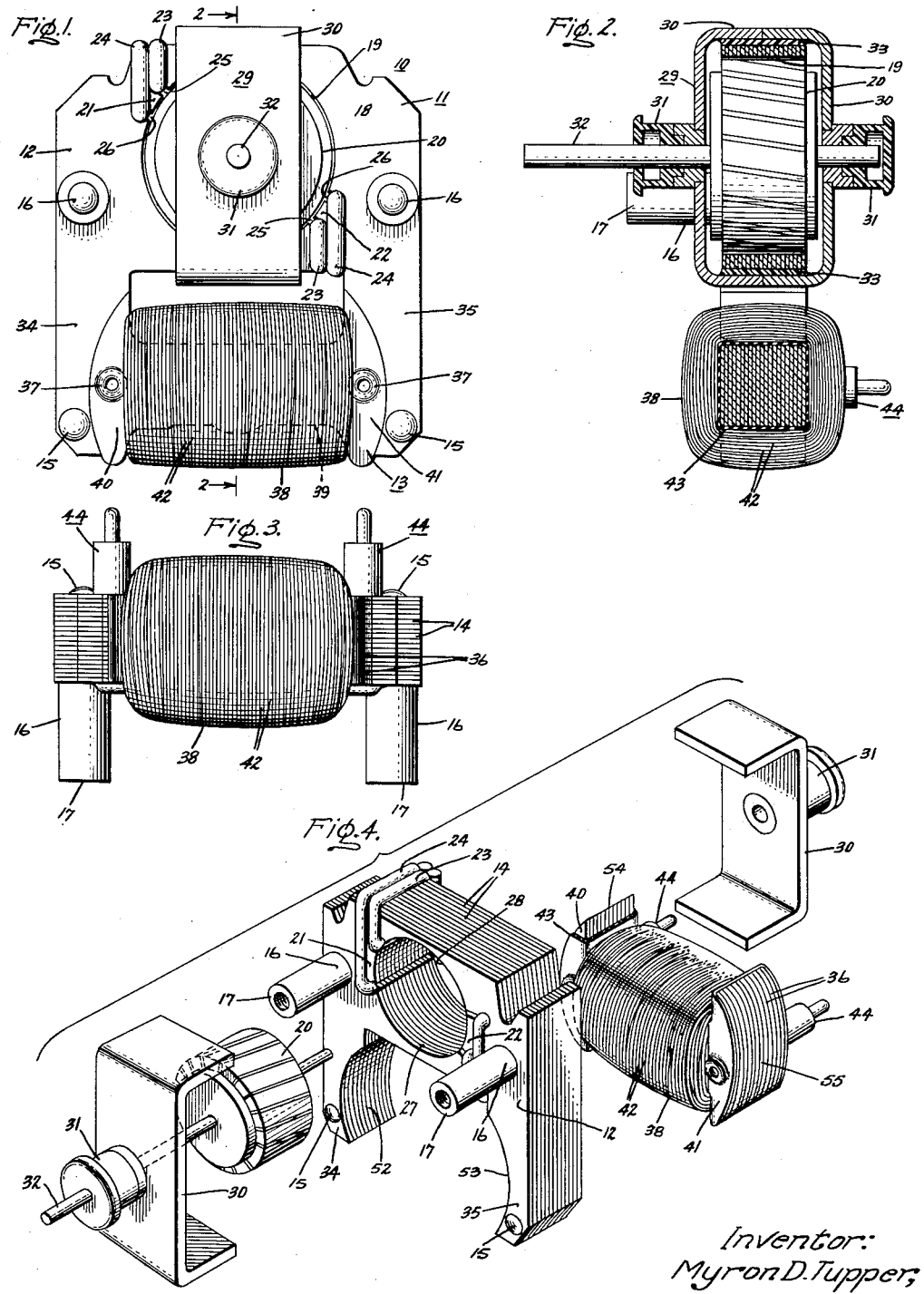
Inventor:
Myron D. Tupper,
by H. F. Manbeck, Jr.
Attorney.

March 6, 1962  M. D. TUPPER  3,024,377
CORE AND COIL IMPROVEMENT FOR SMALL
MOTORS AND THE LIKE
Filed March 30, 1959 2 Sheets-Sheet 2
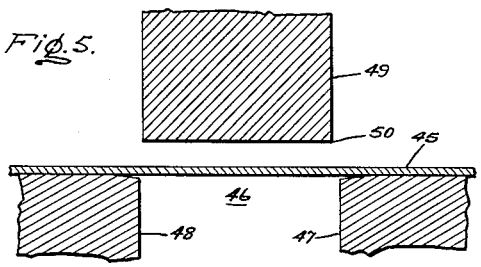
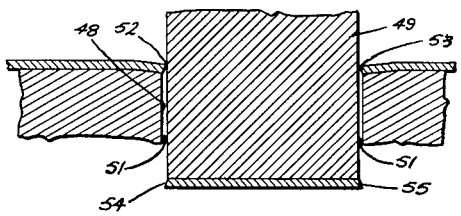
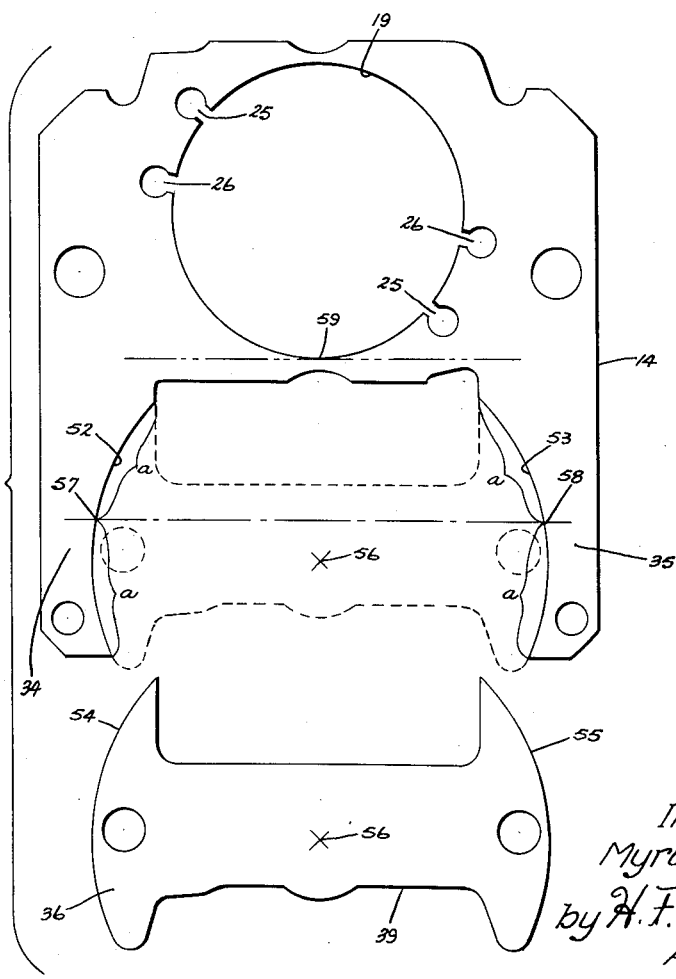
Inventor:
Myron D. Tupper,
by H. F. Manbeck, Jr.
Attorney.

United States Patent Office 3,024,377
Patented Mar. 6, 1962

3,024,377
CORE AND COIL IMPROVEMENT FOR SMALL MOTORS AND THE LIKE
Myron D. Tupper, Fort Wayne, Ind., assignor to General Electric Company, a corporation of New York
Filed Mar. 30, 1959, Ser. No. 802,761
4 Claims. (Cl. 310—172)

This invention relates in general to electrical devices having wound coils for excitation thereof, but is more particularly described in connection with electric motors in the fractional horsepower sizes.

Certain kinds of relatively low cost electric motors of the small horsepower type are conventionally formed with a substantially U-shaped laminated stator yoke section having a rotor receiving bore in the bight portion of the U. A separate laminated core section, which supports a wound coil or excitation winding thereon, is provided to bridge the leg portions of the stator yoke thereby completing a magnetic circuit for the stator. With this construction, it is important that the coil supporting core section is rigidly maintained in a fixed relation with the leg portions of the yoke section so that the connection between the respective sections introduces a minimum of interference or magnetic reluctance into the flux path through the coil supporting core section and the adjacent leg portions of the yoke section. Any sacrifice in area of contact for flux transmission between the respective sections will have an adverse effect on motor performance. Further, it is equally important that motors having any given operating characteristics be produced at a minimum of expense and of overall size. Thus, it will be seen that the provision of a satisfactory yet inexpensive motor is a continuing problem in motor manufacture, particularly in the fractional horsepower sizes.

Accordingly it is a primary object of this invention to provide an improved motor construction involving a minimum of parts and manufacturing costs.

It is another object of the invention to provide an improved motor construction in which the coil supporting section is rigidly connected to the stator yoke section with an excellent area of contact therebetween, providing a proper flux path for the motor at a relatively low cost and without increasing the motor size.

It is a further object of the invention to utilize more completely the stator punching in the completely assembled motor.

Further objects and advantages will become apparent as the following description proceeds and the subject matter which I regard as my invention is pointed out with particularity in the claims annexed to and forming a part of this specification.

In carrying out the objects of this invention in one form thereof, I provide an improved motor having a laminated yoke section formed of magnetic material and a laminated core section for carrying an excitation winding thereon. The yoke section comprises a pair of spaced apart leg portions and a bight portion joining one end of the leg portions together. Each leg portion is provided with an arcuate surface on its inner side for engagement with the core section. The core section for bridging the legs of the yoke section is provided with an arcuate surface at each of its ends in plane engagement with the adjacent arcuate surface of the leg portions. In order to insure a plane engagement between the abutting surfaces, the arcuate surfaces have the same center of revolution, the center being located further away from the bight portion of the yoke section than are the respective linear centers of the leg arcuate surfaces. With this arrangement, the legs push inwardly with a relatively even pressure over more than half of their arcuate lengths and provide an intimate contact between the engaging surfaces of the yoke and core sections thereby forming a mechanical connection having a minimum of magnetic reluctance. Other advantages of this construction will become apparent as the description proceeds.

For a better understanding of the invention, reference may be had to the accompanying drawings, which illustrate one embodiment of the present invention.

In the drawings:
FIGURE 1 is a front elevational view of an electric motor embodying the preferred form of my invention;
FIGURE 2 is a sectional view, taken on line 2—2 of the motor, illustrated in FIGURE 1;
FIGURE 3 is a bottom view of the motor illustrated in FIGURE 1;
FIGURE 4 is an exploded view of the motor of FIGURE 1 showing various motor components in perspective;
FIGURE 5 is a sectional view of a portion of a die or press, with a single stator laminated sheet of magnetic material, placed in position on the press prior to the punching operation in which the coil core laminated is stamped out of the stator yoke lamination;
FIGURE 6 is a view similar to FIGURE 5 after the coil supporting core lamination has been punched out from the stator lamination; and
FIGURE 7 is an exploded view illustrating a single stator lamination and punched out coil supporting lamination after the punching operation illustrated in FIGURES 5 and 6 has been performed.

Referring now to the FIGURES of the drawings, FIGURES 1 through 4 illustrate the preferred embodiment of my invention as being applied to a small shaded pole induction motor 10 of the fractional horsepower size. Briefly described, motor 10 comprises a magnetic field core 11 having a generally U-shaped laminated yoke section 12 and a bridging coil supporting core section 13. The yoke section 12 comprises a plurality of stacked or superposed laminations 14 secured together by any suitable means, such as by rivets 15, which project through aligned apertures provided in the different laminations. Each rivet is slightly headed over at each end to keep the laminations of the stack in a relatively tight compressed relation. Additional lamination securing means in the form of a pair of motor mounting pins 16, received in suitably disposed laterally extending pin receiving apertures, are provided at suitable locations in the yoke section 12. The end 17 of each mounting pin 16 is further available for supporting the motor on a stationary base member (not shown).

Yoke section 12 is defined by a polar portion 18 formed in the bight portion of the U having a bore, as indicated at 19, to receive a rotor member 20. A pair of shading pole projections or faces 21 and 22 are diametrically disposed on the periphery of bore 19, each projection being encircled by closed rings of copper wires 23 and 24 respectively positioned in suitably provided notches 25 and 26. The rings of copper wire form shading coils to accomplish the well-known shaded effect in the encircled field pole projection, in a manner well-known in the motor art. The faces 27 and 28 of the bore, between faces 21 and 22, comprise the main or unshaded poles of the motor. Rotor 20 is mounted in spaced relation to bore 19 and is rotatably journaled in any suitable manner, such as by rotor supporting means, generally indicated at 29. As shown, the means 29 includes stationary members or brackets 30 and bearing means 31 rotatably carrying rotor shaft 32. Brackets 30 are fixedly secured to yoke section 12 in any suitable manner such as by an adhesive material 33.

At the bottom end of the yoke section (as viewed in the drawings) there are formed a pair of spaced apart legs 34 and 35 for supporting the aforementioned core section 13. As shown, section 13 is formed of a plurality of individual laminations 36 secured together in superposed relation by any suitable means such as the lamination securing arrangement generally indicated at 37. The specific manner in which the individual laminations are formed and the resulting configuration will be described in detail hereinafter; however, it should be pointed out at this time that it is preferable to form core section 13 with the same number of laminations as make up yoke section 12. The main magnetizing winding or coil 38 of the motor is wound on a longitudinally extending central leg portion 39 between shoulders 40 and 41 which are integrally formed at the opposite ends of central leg portion 39. The legs 34 and 35 of yoke section 12 firmly engage the outer sides of the respective adjacent shoulders 40 and 41 substantially throughout the lengths of their mating surfaces. The full importance of the construction and arrangement of the yoke section legs and the core section to accomplish this result, forming a very important aspect of my invention, will become apparent as the description develops.

As illustrated in FIGS. 1–4, coil 38 consists of a plurality of turns of wire 42, such as copper magnet wire having a resin coating. The coil is insulated from section 13 in any suitable manner as by a hardened coating of thermoplastic material 43. Suitable means may be provided at each end of the coil, such as the terminal assembly generally indicated at 44, for connecting the main coil with a power source (not shown). The terminal and lamination securing arrangement of the type set forth above, forms no part of the present invention and is disclosed and claimed in my co-pending application, Serial No. 802,764, filed on the same date as the present application and assigned to the same assignee.

The manner in which the individual laminations of yoke section 12 and core section 13 are produced and the resulting lamination construction are illustrated by FIGURES 5–7 inclusive. It is preferable in the manufacture of devices of this type to stamp the core and yoke laminations from the same sheet of material thereby effecting a great savings of material and insuring a good fit. Referring specifically to FIGURE 7, it is seen that the individual core laminations 36 are stamped from the bottom portion (as viewed in the drawings) of the yoke laminations 14, forming the leg portions of the yoke as well as the core itself. With this arrangement, the yoke and core punchings may be assembled separately and subsequently the assembled core section may be inserted back between the leg portions of the assembled yoke section.

The formation of the respective core and yoke sections may be accomplished in the following manner. Initially the outer periphery of the individual yoke laminations may be formed by a standard type punching operation (not shown). In addition, during the same operation, the rotor bore, shading coil notches, and rivet and other lamination securing apertures may be removed from the laminations. The final punching operation is illustrated by FIGURES 5 and 6, particularly to show the shape of the lateral edges of the mating surfaces formed on the yoke and core laminations as the core laminations are stamped out and separated from between the yoke legs. Referring to FIGURE 5, numeral 45 denotes the yoke lamination before the core lamination is separated therefrom. The die press or punch for performing the punching operation, generally indicated at 46, is of any standard kind having means (not shown) to retain the material to be stamped in a relatively fixed position within the press. In addition, the press generally includes a stationary die or plate 47 having a cutter receiving aperture 48 and a movable punching member 49 having a cutting edge 50 adapted to cooperate with aperture 48 to cut or stamp out core laminations 14 of the desired configuration.

As shown in FIGURE 6, punching member 49 is pressed into aperture 48 by any suitable means (not shown), forming legs 34 and 35 of yoke lamination 14 and core lamination 36. Due to the clearance, indicated at 51, between plate aperture 48 and the cooperating punching member 49, as well as the punching or tearing action of the stamping operation, the inner edges 52 and 53 of the yoke legs and the corresponding cut edges 54 and 55 respectively of the core lamination become somewhat elongated or deformed by an amount equal to the clearance 51. For purposes of illustration only, the clearance and edge deformation are somewhat exaggerated in FIGURE 6. Further, it will be understood of course that more than a single yoke and core lamination may be formed simultaneously, but for simplicity of illustration, the formation of only one yoke and core lamination has been shown and described in detail. After the yoke and core laminations have been stamped out in the manner previously described, the sections may be separately assembled by any suitable procedure well known in the art. The completely assembled core section 13 with the main coil 38 wound thereon may then be fixedly secured in a finally assembled position (shown in FIGURE 1) between the leg portions of yoke section 12 by any suitable means, such as by a pressing operation.

It should be noted that the symmetry of the individual core and yoke laminations permit assembly of the separate sections without particular attention being directed to which face of the individual laminations is assembled in juxtaposition to the next lamination. Further, as be seen from the discussion hereinafter presented, the deformation of the edges 52, 53, 54 and 55, generally resulting from the stamping operation, will not affect the intimate contact of the mating surfaces.

By a very important aspect of the present invention, the engaging surfaces of the yoke and core sections are so contoured and formed that the pressure of the leg portions 34 and 35 of the yoke section provides an excellent mechanical connection or joint between the sections at a minimum of manufacturing costs. The connection is exceedingly efficient having an intimate or "plane" contact between the engaging surfaces, and therefore the connection has unusually good (low) magnetic reluctance characteristics, providing a minimum of interference with the flux path through the core section and the adjacent leg portions of the yoke section.

To effect this result, the engaging edges or surfaces of the mating yoke leg portions and core shoulders are so formed that pressure is applied by the yoke leg portions to the bridging core section substantially throughout the length of their joining surfaces. More specifically, as seen in FIGURE 7, the edges or surfaces 52 and 53, provided on the respective inner sides of the leg portions 34 and 35, and the edges or surfaces 54 and 55 of the core section are all formed in the shape of an arc, each arc having the same center of revolution 56. That is to say, in effect, each arc comprises a section of the same circle. Further, the linear centerpoints 57 and 58 of the arcuate-shaped surfaces 52 and 53 of the leg portions; i.e., the halfway points of the arcs themselves defining equal arc lengths "a" both above and below the centerpoints 57 and 58, lie above the center of revolution 56, as viewed in the drawings. This center of revolution 56 is located further away from the bight or polar portion of the yoke section 12 than are the respective arc center points 57 and 58. In other words, assuming a horizontal line 59 were drawn tangent to the bottom of the rotor bore 19, the center of revolution 56 would be located further away from such horizontal tangent line than would be the centerpoints 57 and 58 of the respective arcs. This arrangement causes the legs to push inwardly with a relatively even pressure throughout substantially their lengths as the coil section is press fitted between them.

It will also be noted that the legs decrease steadily in thickness for the greater part of the arcs. Except for the very lower ends of the arcs, they progressively decrease in width as they extend further away from the rotor bore 19. This, together with the location of the arcs as discussed above, results in the legs applying a relatively uniform pressure to the coil sections substantially throughout their lengths of contact. In effect, the legs, when forced apart by the lateral edges 52 and 53 of the core section 13 as it is inserted therebetween, will react similarly to cantilever beam members, pivoting around the bight portion of the yoke section 12 and applying pressure inwardly toward the core section 13. With this construction, the arcs of all the mating surfaces substantially function in accordance with the well known "true arc ring" principle in which the radius of the arc changes under deflection, but still maintains a perfect circle. Thus, regardless of the deflection of the yoke legs which may be caused by the insertion of the core section therebetween, the arcs of the mating surfaces, 52 with 54 and 53 with 55 will always define a section of a circle and an intimate contact between the parts is always insured.

If uniformity of pressure were the only consideration involved, it might be desirable to have the legs decrease in width for their entire lengths. However, to produce a satisfactory production design which is strong enough for practical use, particularly with rivet holes provided at the ends of the legs, it is advantageous to use the illustrated configuration of FIGURE 7 wherein the legs decrease in width for the greater part of their lengths, but not for the entire length. Further, of course, it is necessary that each arc "swing back in" at its lower end to provide a retaining action for preventing the core section from falling downwardly (as viewed in the drawings) from its assembled position between the legs. Thus, by utilizing the illustrated embodiment of FIGURE 7, a large practical area of contact and excellent mechanical fit is provided.

It should be apparent to those skilled in the art that the deformed edges of the individual laminations provide an opening between leg portions 34 and 35 of the laminated yoke section 12 which is slightly smaller in width than the largest longitudinal dimension of the core section. Therefore, without the use of the arcuate contour of the present invention, if the core section were pressed back between the inner sides of the yoke legs without first shaping the engaging surfaces, as by a machining operation, the legs would be forced apart and the cooperating surfaces of the respective sections would normally make only a point or line contact, thereby providing a decreased area of engagement for flux transmission. Hence the mechanical joint would have poor reluctance characteristics and motor performance would be adversely affected. If in an effort to provide a plane or intimate engagement between the abutting surfaces of the core and yoke sections as produced by the present invention, a shaping process, as for example a machining operation, were performed on the cooperating surfaces, such additional inherently expensive manufacturing step would not only add to the cost of the overall manufacturing procedure, but also it would be unsatisfactory in other respects. For instance, since the interference between the cooperating edges of the parts is not exceedingly large, difficulty would be experienced in milling the exact amount of material from the respective edges. Further, if too much material were removed from the edges, it would be impossible to join the parts together without the employment of additional securing means or quite possibly the assembled core section could not be successfully utilized in the motor at all due to the lack of sufficient contact between the adjacent edges.

Therefore, it will be readily apparent to those skilled in the art that my improved motor construction provides an effective securement between the yoke and core sections without the need for bolts or other fastening means. Further, a uniform and permanent pressure is obtained between the core and yoke sections providing a superior joint having a "plane type" engagement between the abutting members substantially throughout the lengths of their mating surfaces thereby producing a minimum of magnetic reluctance. In addition, the accurate and intimate fit between the yoke and core sections is produced by a simple punching operation without the necessity for additional shaping steps which would otherwise be required, resulting in a minimum of manufacturing steps and costs. Further, the punch dies used to form the mating edges of the individual laminations being circular in configuration are relatively inexpensive to make and easy to maintain while the laminations formed by them result in a saving of material.

While the present invention has been described by reference to a particular embodiment thereof in accordance with the patent statutes, it is to be understood that modifications may be made by those skilled in the art without actually departing from the invention thereof. Therefore, I aim in the appended claims to cover all such equivalent variations as come within the true spirit and scope of the invention.

What I claim as new and desire to secure by Letters Patent of the United States is:

1. An electric device comprising a yoke section formed of magnetic material having at least one pair of spaced apart leg portions and a bight portion joining the one end of said leg portions together, each of said leg portions being formed with an arcuate surface on its inner side, and a coil supporting core section bridging said yoke leg portions, said core section having spaced apart arcuate surfaces in mating engagement with the adjacent arcuate surface of said leg portions and being supported solely by said mating engagement, said arcuate surfaces having substantially the same center of revolution, said center of revolution being located further away from said bight portion than are the respective linear center points of said mating surfaces between the yoke and core sections whereby said leg portions push inwardly with a relatively even pressure over more than half of the mating arcuate lengths to produce an intimate contact between the engaging surfaces of the respective sections thereby forming a mechanical connection having a minimum of magnetic reluctance.

2. In an electric device having a stator yoke section, an excitation coil and a longitudinally extending coil supporting core section, said yoke section comprising a pair of spaced apart leg portions and a bight portion joining the one end of said leg portions together, each of said leg portions having an arcuate surface formed on its inner side and progressively decreasing in width for the greater part of said arcuate surface, said core section having arcuate surfaces provided on its ends in mating engagement with the adjacent arcuate surface of said leg portions and carrying said excitation coil, said arcuate surfaces having substantially the same center of revolution located further away from said bight portion than are the respective linear center points of said mating surfaces between the yoke and core sections arcuate surfaces whereby said leg portions push inwardly with a relatively even pressure over more than half of the mating arcuate lengths to produce an intimate contact between the engaging surfaces of the respective sections thereby producing a mechanical connection having a minimum of magnetic reluctance.

3. In an electric motor, a laminated magnetic yoke section comprising a pair of spaced apart leg portions and an integrally formed bight portion joining the one end of said leg portions together, said bight portion having a rotor receiving bore provided therein, a rotor mounted within said bore for relative rotation therewith, each of said leg portions being formed with an arcuate surface on its inner side and a laminated coil supporting core section for bridging said yoke leg portions having a longitudinally extending central leg portion and a shoulder having an arcuate surface provided at each end of said central leg portion, an excitation coil carried on said central leg portion between said shoulder portions, said core section being arranged between said leg portions and joined thereto solely by the plane and mating engagement of said shoulder arcuate surfaces with the adjacent arcuate leg surfaces, said arcuate surfaces having substantially the same center of revolution, said center of revolution being located further away from a horizontal line drawn tangent to the bottom of the rotor bore than are the respective linear centerpoints of the mating surfaces between the yoke and core sections, whereby said leg portions push inwardly with a relatively even pressure over more than half of the mating arcuate lengths thereby producing an intimate contact between the engaging surfaces of the respective sections and forming a mechanical connection having a minimum of magnetic reluctance.

4. In an electric motor, a stator yoke section formed of magnetic material having at least one pair of spaced apart leg portions and a bight portion joining the one end of said leg portions together, said bight portion formed with a rotor receiving bore, each of said leg portions including an arcuate surface on its inner side, a coil supporting core section arranged between and bridging said leg portions, said core section having an arcuate surface in mating relation with the adjacent arcuate surface of each of said leg portions, said leg portions progressively decreasing in width for the greater length but not all of the respective mating arcuate surfaces, all of said arcuate surfaces having substantially the same center of revolution, said center of revolution being located further away from a line drawn tangent to the closest part of said rotor receiving bore relative to said core section than are the respective linear centerpoints of the mating surfaces between the yoke and core sections, whereby said leg portions push inwardly with a relatively even pressure over more than half of their mating arcuate lengths to produce an intimate contact between said mating surfaces thereby forming a mechanical connection of relatively low magnetic reluctance.

References Cited in the file of this patent

UNITED STATES PATENTS 2,807,735     Naul _____ Sept. 24, 1957